(12) United States Patent
Sarlin et al.

(10) Patent No.: US 11,499,590 B2
(45) Date of Patent: Nov. 15, 2022

(54) ATTACHMENT INTERFACE FOR CONNECTING A VEHICLE COMPOSITE COMPONENT

(71) Applicants: Aktiebolaget SKF, Gothenburg (SE); SKF Aerospace France S.A.S, Montigny-le-Bretonneux (FR)

(72) Inventors: Remi Sarlin, Allex (FR); Laurens Verhulst, Utrecht (NL); Michiel Warmerdam, Loenen (NL)

(73) Assignees: AKTEIBOLAGET SKF; SKF AEROSPACE FRANCE S.A.S.

( * ) Notice: Subject to any disclaimer, the term of this patent is extended or adjusted under 35 U.S.C. 154(b) by 472 days.

(21) Appl. No.: 16/508,633

(22) Filed: Jul. 11, 2019

(65) Prior Publication Data

US 2020/0049202 A1 Feb. 13, 2020

(30) Foreign Application Priority Data

Aug. 8, 2018 (IT) .......................... 102018000007977

(51) Int. Cl.
*F16C 35/077* (2006.01)
*B29C 70/84* (2006.01)
(Continued)

(52) U.S. Cl.
CPC .......... *F16C 35/077* (2013.01); *B29C 70/845* (2013.01); *B62D 7/166* (2013.01); *B62D 7/18* (2013.01)

(58) Field of Classification Search
CPC ........ F16C 35/077; F16D 3/02; B29C 70/845; B62D 7/005; B62D 7/166; B62D 7/18;
(Continued)

(56) References Cited

U.S. PATENT DOCUMENTS 10,150,342 B2 * 12/2018 Graeuler ................ B60G 3/202
10,184,503 B2 * 1/2019 Mori ......................... F16B 5/02
(Continued)

FOREIGN PATENT DOCUMENTS

DE 102015202035 8/2016
EP 1270284 A1 * 1/2003 ............... F16F 9/54
JP 2845581 B2 * 1/1999

OTHER PUBLICATIONS

International Search Report for Italy Patent Application No. 201800007977.
(Continued)

*Primary Examiner* — James A English
*Assistant Examiner* — Scott F. Underwood

(57) ABSTRACT

An attachment interface is provided for connecting a vehicle composite component having a plate portion that is made of a fiber reinforced polymer and has a passage extending in a through manner along an axis. The attachment interface provides a metal attachment device, which includes an inner portion engaging the passage and an outer portion defining a connection point suitable to be connected to another vehicle element. The plate portion is axially sandwiched between two layers made of a fiber reinforced polymer composite material selected from the group consisting of BMC (Bulk Molding Compound), LFT (Long Fiber Thermoplastic) and DLFT (Direct Long Fiber Thermoplastic).

8 Claims, 3 Drawing Sheets

(51) Int. Cl.
*B62D 7/16* (2006.01)
*B62D 7/18* (2006.01)

(58) Field of Classification Search
CPC .......... B60G 2204/416; B60G 2206/50; B60G 2206/7101; B60G 2206/82
See application file for complete search history.

(56) References Cited

U.S. PATENT DOCUMENTS

| | | |
|---|---|---|
| 11,192,582 B2 * | 12/2021 | Falossi ..................... B60G 3/01 |
| 2016/0121927 A1 | 5/2016 | Schaake et al. |
| 2017/0008558 A1 | 1/2017 | Kruger et al. |
| 2017/0210188 A1 | 7/2017 | Meyer et al. |
| 2019/0001773 A1 * | 1/2019 | Kwon ................. F16C 11/0657 |
| 2019/0003523 A1 * | 1/2019 | Kuroda ................... F16C 11/06 |

OTHER PUBLICATIONS

Feraboli et al., Lamborghini "Forged Composite" Technology for the Suspension Arms of the Sesto Elemento, pp. 1-13.
Composite-Lightweight Rear Suspension Knuckle for a High Volume Passenger Vehicle pp. 1-4.
Dr. Ing, et al., Development of a Fiber-Composite Suspension Strut/Knuckle Module; pp. 267-280.

* cited by examiner

ATTACHMENT INTERFACE FOR CONNECTING A VEHICLE COMPOSITE COMPONENT

CROSS-REFERENCE TO RELATED APPLICATIONS

This application claims priority to Italian patent application no. 102018000007977 filed on Aug. 8, 2018, the contents of which are fully incorporated herein by reference.

FIELD OF THE INVENTION

The present invention concerns an attachment interface for connecting a vehicle composite component to another vehicle element. In particular, the present disclosure refers to an attachment interface for connecting a vehicle suspension upright or knuckle to a steering control arm and/or to support arms of the vehicle suspension.

BACKGROUND OF THE INVENTION

As it is known, e.g. from US2016121927A1, in the interests of fuel economy there is an increasing drive within the automotive industry towards weight reduction of the component parts of vehicles. One such component is the steering knuckle, which connects the wheel bearing to the vehicle suspension. More in general, such components include all the uprights of the vehicle suspension.

Typically, there is the need of manufacturing the knuckle/upright from a lightweight composite material, such as a fiber-reinforced polymer. In this field, the most effective composite structure is in the shape of a laminate or plate element, i.e. a relatively thin element that can be formed so as to have suitable curvatures and define a shell portion in the vehicle component.

However, when choosing composite plate elements for forming vehicle components, a problem arises in how to connect this kind of composite structure to the other parts of the vehicle and how to transfer a localized high load to such a composite structure.

Indeed, in the field of vehicle suspension components, the latter are connected to support or control arms by articulated connections, like ball joints, that transfer very high loads as substantially local (punctual) loads. This can be a limit for the introduction of fiber reinforced polymers in such suspension components, because the composite materials in the form of plate or shell elements, in general, cannot sustain localized loads.

An example of attachment interface according to the prior art is disclosed in US2017/008558A1, which corresponds to the preamble of claim 1.

BRIEF SUMMARY OF THE INVENTION

The object of the present invention is to provide an attachment interface for connecting a vehicle composite component, which solves the above-mentioned problem by ensuring an optimized transfer of forces and loads, to and from such composite component.

According to the invention, an attachment interface for connecting a vehicle composite component is provided, as defined in the appended claims.

BRIEF DESCRIPTION OF THE SEVERAL VIEWS OF THE DRAWING

The invention will now be described with reference to the accompanying drawings, which illustrate a non-limiting embodiment thereof, in which.

DETAILED DESCRIPTION OF THE INVENTION

Figure 1:
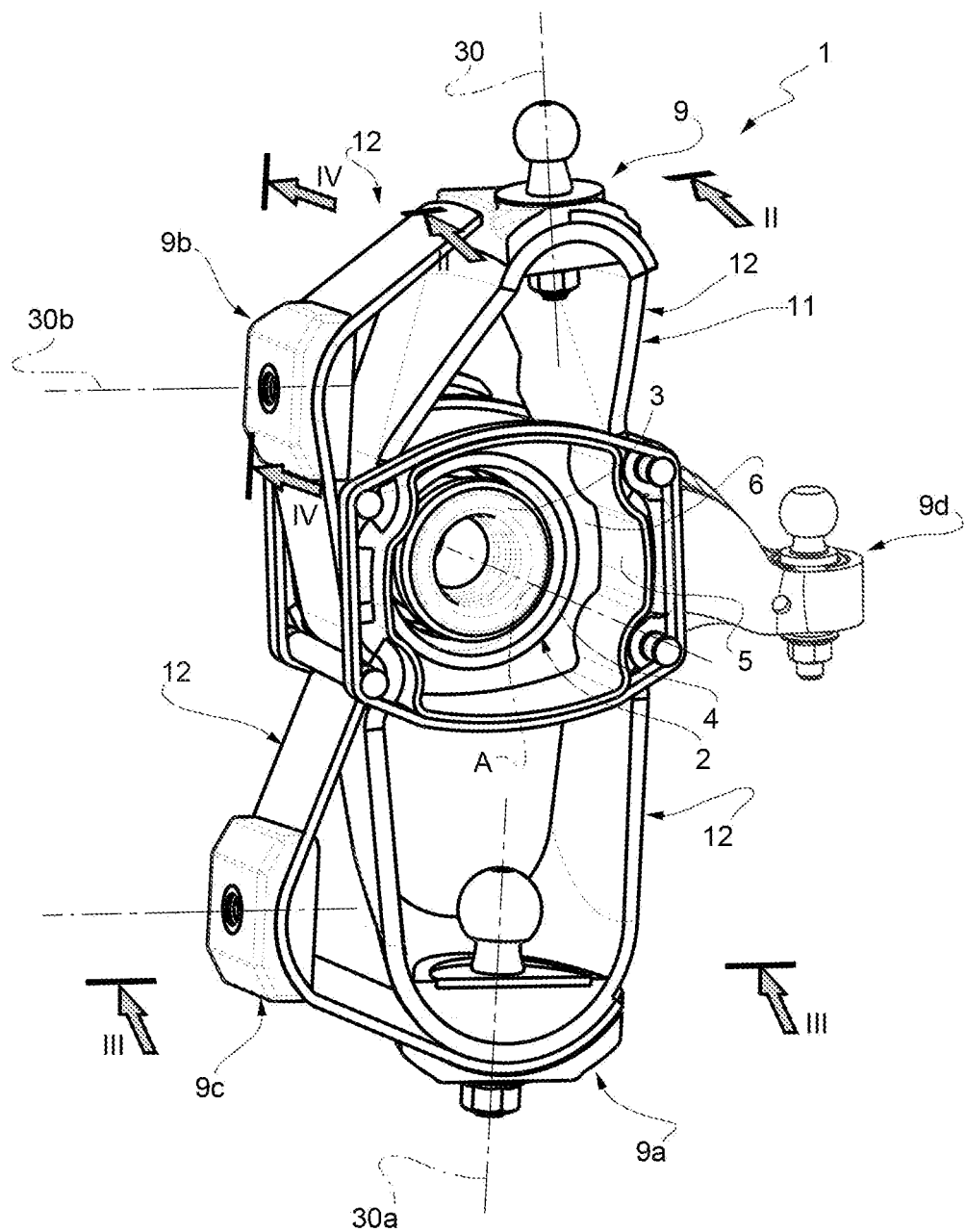
FIG. 1 is a perspective view showing a vehicle composite component provided with preferred embodiments of the attachment interface, according to the present invention, for connecting such a vehicle composite component to other vehicle elements.

With reference to FIG. 1, reference number 1 indicates a vehicle lightweight component, defined in particular by a lightweight suspension upright or knuckle (a steering knuckle in the non-limitative embodiment shown).

The lightweight suspension upright or knuckle 1 is represented in a schematic, non-limitative manner only, in order to make clearer the concept on which the invention is based. It is therefore clear that the present invention applies to vehicle lightweight components having any suitable different shape and function, so that the invention is not limited in any manner to the specific embodiment shown.

According to one aspect of the invention, the suspension upright or knuckle 1 is made, in a manner that will be described in details herein below, in a composite material, e.g. a fiber reinforced synthetic plastic resin.

In particular, the suspension upright or steering knuckle 1 comprises a bearing connection interface 2 for receiving a wheel rolling bearing 3, the latter being an HBU (Hub Bearing Unit) well known in the art and accordingly not shown and described in details for sake of simplicity.

The bearing connection interface 2 includes a first sleeve element 4 having a cylindrical shape and an axis of symmetry A coinciding, in use, with a rotation and symmetry axis of the wheel bearing 3. In the non-limiting example shown, the first sleeve element 4 is metallic and preferably consists of a steel outer ring of the wheel rolling bearing or HBU 3. Alternatively, the first sleeve element 4 may be configured to receive in known manner, e.g. by interference fitting, the wheel bearing 3 and may be, in this case, made either of a metal alloy or of a fiber reinforced synthetic plastic.

According to a preferred aspect of the invention, the bearing connection interface 2 also comprises a second sleeve element 5, arranged radially outside the first sleeve element 4, and an annular body 6 arranged radially inside the second sleeve element 5. The annular body 6 is made of a composite material, which is preferably selected from the group consisting of BMC (Bulk Molding Compound), LFT (Long Fiber Thermoplastic) and DLFT (Direct Long Fiber Thermoplastic).

In the particular embodiment that is shown, the annular body 6 is coaxial with the first sleeve element 4.

According to an aspect of the present invention, the lightweight suspension upright or knuckle 1 comprises a plurality of attachment interfaces 9, 9a, 9b, 9c and 9d, configured to connect, in use, the suspension upright or knuckle 1 to a respective control or support elements, known and not shown for sake of simplicity. In particular, attachment interfaces 9 and 9*a* are used for the connection of knuckle 1 to respective support arms of a vehicle suspension; attachment interfaces 9*b* and 9*c* are used for the connection of a brake caliper to knuckle 1; and attachment interface 9*d* is used for the connection of knuckle 1 to a control or steering arm of a vehicle steering device.

The lightweight suspension upright or knuckle 1 further comprises a supporting structure 11 mechanically connecting the bearing connection interface 2 to the attachment interfaces 9,9*a*,9*b*,9*c*,9*d*.

The supporting structure 11 is made of a fiber reinforced composite material comprising at least one blade or plate element 12. In particular, the supporting structure 11 is shaped as a reticular frame comprising a plurality of blade or plate elements 12 chemically and/or mechanically interconnected to each other. Preferably, at least one the blade elements 12 is also chemically and/or mechanically bound directly to an outer lateral surface of the bearing connection interface 2, so as to join integral in one piece therewith.

Conveniently, each blade element 12 consists in one or more mats or plies of continuous fibers embedded in a polymer matrix. When the blade elements 12 are formed by more than one mat or plie, the latter are stacked onto one another. In particular, to obtain the blade elements 12 such mats or plies have been compression molded to one another and at least one of the blade elements 12 has been compression molded to the outer surface of the bearing connection interface 2.

More in general, each blade element 12 comprises a (thermoset or thermoplastic) polymer matrix, and reinforcing fibers (e.g. glass and/or carbon and/or aramid) embedded in such a matrix.

Figure 2:
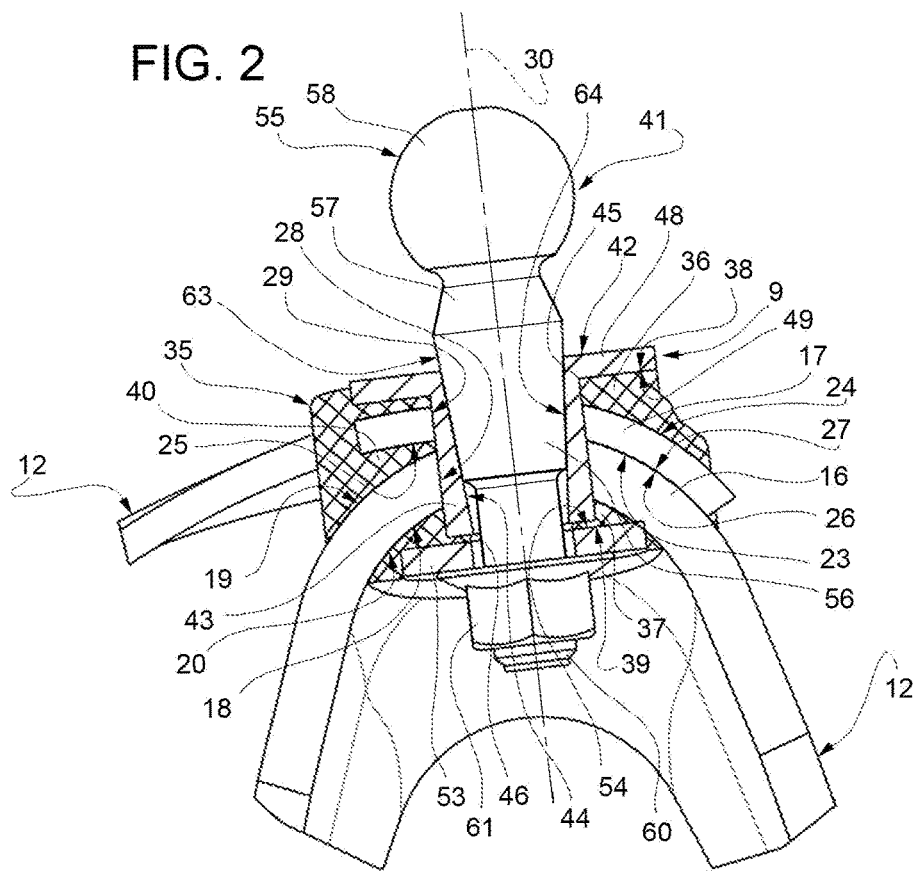
FIG. 2 is a cross section of one of the attachment interfaces of FIG. 1, taken along a section plane identified by line II-II in FIG. 1.

With reference to FIG. 2, according to an aspect of the present invention, the attachment interface 9 comprises at least one plate or blade portion, in particular two plate or blade portions 16 and 17, which define part of respective blade elements 12 and are arranged one over the other.

The plate portion 16 has two opposite faces 18 and 19, with a substantially constant thickness between faces 18 and 19. According to variants, not shown, the thickness between faces 18 and 19 is variable. In the specific embodiment that is shown, the plate portion 16 is shaped so as to define a cavity 20, in particular facing towards axis A. Face 18 is concave and delimits the cavity 20, while face 19 is convex and is facing outwards.

In a similar way, the plate portion 17 is defined by two opposite faces 23 and 24, preferably with a substantially constant thickness between faces 23 and 24. Face 23 is arranged towards face 19, while face 24 is facing outwards. In particular, face 23 comprises a zone 25 which is spaced apart from face 19, and a zone 26, which is in contact with a zone 27 of face 19 and has a shape matching the one of zone 27.

The plate portions 16 and 17 have respective passages 28 and 29, which extend through, along an axis 30 transversal to faces 18,19,23,24.

According to an aspect of the present invention, attachment interface 9 comprises a composite material 35 that is defined by a fiber reinforced polymer, covers at least faces 18 and 24 and, advantageously, is selected from the group consisting of BMC (Bulk Molding Compound), LFT (Long Fiber Thermoplastic) and DLFT (Direct Long Fiber Thermoplastic).

BMC, as well as LFT/DLFT, are synthetic plastic materials in which individual reinforcing fibers of considerable length (usually ½ inch or 12 mm) are uniformly dispersed within a synthetic plastic matrix without a specific orientation (or oriented by the flow during the compression but never arranged in layers) while, e.g., in SMC materials the fibers are disposed in layers. In BMC materials, the synthetic plastic matrix is generally formed by a thermosetting resin and such materials are adapted to be formed, generally, by compression molding; in LFT/DLFT materials the synthetic plastic matrix is defined by a thermoplastic resin and such materials are adapted to be formed by injection/compression molding.

Moreover, in both the BMC and LFT/DLFT materials the reinforcing fibers are of uniform length.

Preferably, in the final, molded material the individual reinforcing fibers form groups of fibers aligned with respect to each other, and the groups are uniformly dispersed randomly in the matrix, in order to give rise to a nearly isotropic material.

In particular, composite material 35 is directly in contact with the faces 18,19,23,24. Composite material 35 comprises at least two layers 36,37 respectively arranged in fixed positions on plate portions 16, 17 and axially delimited, respectively, by surfaces 38 and 39, opposite to each other along axis 30. In such a way, the plate portions 16 and 17 are sandwiched between the layers 36 and 37. In particular, layers 36 and 37 are defined by pieces that are separate from one another.

Conveniently, the composite material 35 comprises a further layer 40, which fills in any possible gap between faces 23 and 19 and, in particular, is integral with layer 36, so as to define a single pad or block, that encloses at least part of the plate portion 17 (FIG. 1). On the other side, layer 37 defines a pad that fills in, at least partly, the cavity 20.

The attachment interface 9 further comprises an attachment device 41 made of metal material (e.g. aluminum alloy and/or steel) and comprising an insert 42, which engages passages 28 and 29 and is at least partly embedded in the composite material 35. In the shown embodiment, insert 42 comprises a sleeve 43, which coaxially engages passages 28 and 29, is embedded in the composite material 35 and has an axial hole 44, preferably open at both axial ends of the sleeve 43, such axial ends being indicated by reference numbers 45 and 46.

Preferably, the insert 42 further comprises a flange 48, which is provided at the axial end 45, projects radially outwardly from the sleeve 43 and defines an annular shoulder 49 extending transversally to axis 30 and in contact with surface 38. In the particular non limiting example, flange 48 is partially embedded in layer 36.

Preferably, the metal attachment device 41 further comprises a washer 53, which is spaced apart from insert 42 (i.e. is spaced apart from the axial end 46 of the sleeve 43) and defines a shoulder 54 extending transversally to axis 30 and in contact with surface 39. More preferably, washer 53 is partially embedded in layer 37.

In this way, the composite material 35 is axially sandwiched between the shoulders 49 and 54. In order to obtain this arrangement during the manufacturing process, conveniently, the composite material 35 is cast in a molding process so as to be shaped according the profile of the faces 18,19,23,24. In other words, the insert 42 and the washer 53 are first placed in a mold, along with the plate elements 12; afterwards, a fiber reinforced polymer, e.g. a BMC compound, is overmolded onto the plate portions 16 and 17, the insert 42 and the washer 53 so as to fill in the void spaces; and finally such polymeric material is cured to finally form the layers of the composite material 35.

According to a variant, the insert 42 and/or the washer 53 are provided after having overmolded the fiber reinforced polymer onto the plate portions 16 and 17, i.e. the insert 42 and/or the washer 53 are coupled to the composite material 35 already formed by molding.

Still with reference with FIG. 2, the metal attachment device 41 further comprises an attachment element 55, which has a shape elongated along axis 30 and, in turn, comprises a pin inner portion 56, coaxially engaging the hole 44, and an attachment outer portion 57, axially projecting outside of the composite material 35 and the insert 42 so as to define a connection point for connecting another vehicle component. In the attachment interface 9 shown in FIG. 2, the attachment outer portion 57 comprises a spherical joint 58 suitable to be coupled to a suspension arm (not shown).

The attachment element 55 is coupled in a fixed position to the insert 42 thanks to a coupling, preferably a threaded coupling comprising a threaded end portion 60 of the attachment element 55 and a threaded nut 61, which is screwed on portion 60 and axially rests (directly or indirectly) on washer 53. In the meantime, the pin inner portion 56 is axially hold in the hole 44 in a fixed position by a conic fitting. In other words, the pin inner portion 56 has a conical surface 63 which is in contact and matches with a conical surface 64 of the sleeve 43 at the axial end 45. It is evident that the tightening exerted on the threaded coupling causes an axial tension on the pin inner portion 56 and a consequent axial compression on the composite material 35 between the shoulders 49 and 54. Indeed, the axial load exerted by the tightened threaded coupling is transferred by the conical surface 63 on the conical surface 64 and, therefore, on the whole insert 42; thanks to this axial load, the flange 48 is axially pulled towards the washer 53 so as to compress the composite material 35 and, therefore, the plate portions 16 and 17 along axis 30.

According to variants that are not shown, the conic fitting can be replaced by a flange of the portion 57, axially resting onto the flange 48, or directly onto the surface 38 (i.e. without a flange at the axial end 45).

The use of the composite material 35 to form layers 36, 37 and 40, in which the plate portions 16 and 17 are sandwiched, allows for transferring and distributing loads between the metal attachment device 41 and the plate portions 16,17 in a more uniform manner. Indeed, the loads are not transferred directly between the sleeve 43 of the insert 42 and the plate portions 16,17 (at the edge of the passages 28,29), but they are transferred between the insert 42 and the composite material 35, on the one hand, and between the composite material 35 and the faces 18,19,23, 24, on the other hand. In other words, the layers 36, 37 and 40 have the function of progressively distributing a localized load along the relatively wide areas of the faces 18,19,23,24, so as to obtain lower localized stresses on the plate portions 16,17 that are covered by such layers 36, 37 and 40. In particular, the insert 42 receives the load from the attachment element 55 by the threaded coupling and transfers such load to the composite material 35, that is formed so to distribute (preferably in an uniform manner) the load to the wider areas of the plate portions 16,17 without exceeding the allowed stresses. In other words, during the design stage the parts of the attachment interface 9 are to be sized so as to achieve in each transition a contact pressure that, in any loading condition resulting from the specific case, is not exceeding the stresses allowed by the specific material.

As mentioned above, the attachment interface 9 is also made to keep the plate portions 16 and 17 compressed, in direction parallel to axis 30, between shoulders 49 and 54: this compression aids in preventing possible delamination failures of the plate portions 16 and 17. The applied precompression has to be high enough to keep the plate portions 16,17 in a compression state, but without exceeding compression limits.

Figure 3:
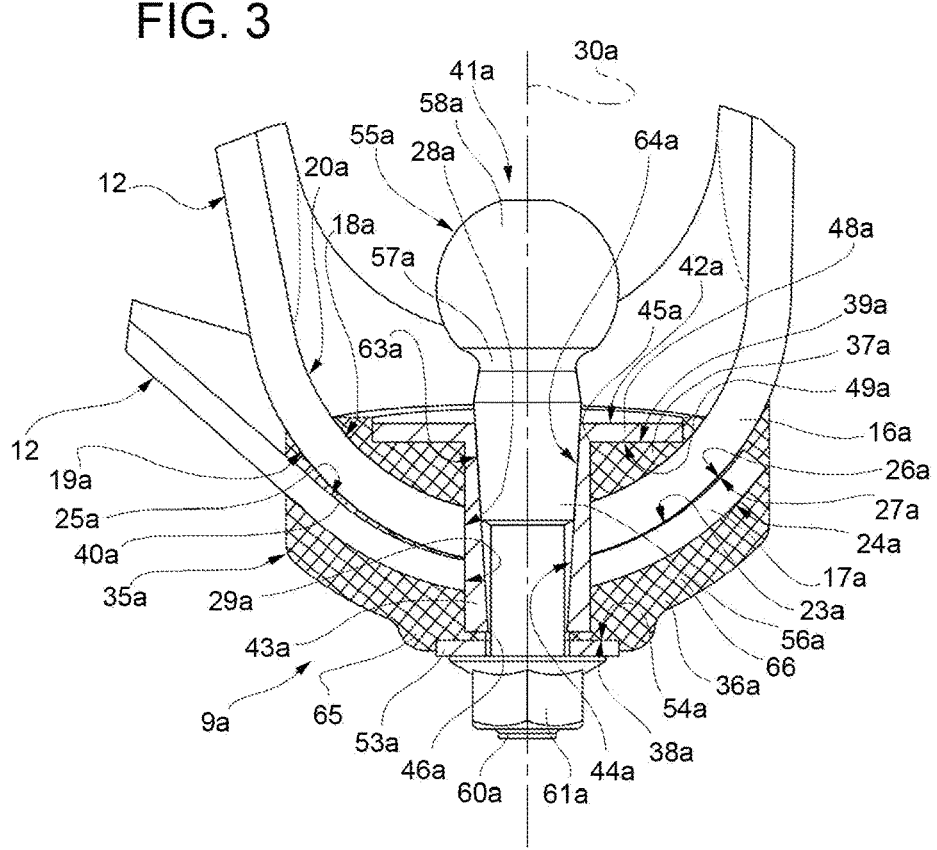
FIG. 3 is a cross section of another attachment interface of FIG. 1, taken along a section plane identified by line in FIG. 1.

FIG. 3 shows the attachment interface 9*a*, which comprises parts indicated by the same reference numbers used in FIG. 2 for the attachment interface 9, but followed by reference letter "a". In comparison with the metal attachment device 41 of FIG. 2, the metal attachment device 41*a* has an arrangement that is inverted so as to provide the spherical joint 58*a* in the cavity 20*a* and provide the washer 53*a* on the surface 38*a*.

Besides, conveniently, the layer 36*a* comprises a peripheral portion 65, having a substantially constant thickness with respect to face 24*a*, and an intermediate portion 66 housing the axial end 46*a* and having a higher thickness than the peripheral portion 65.

Figure 4:
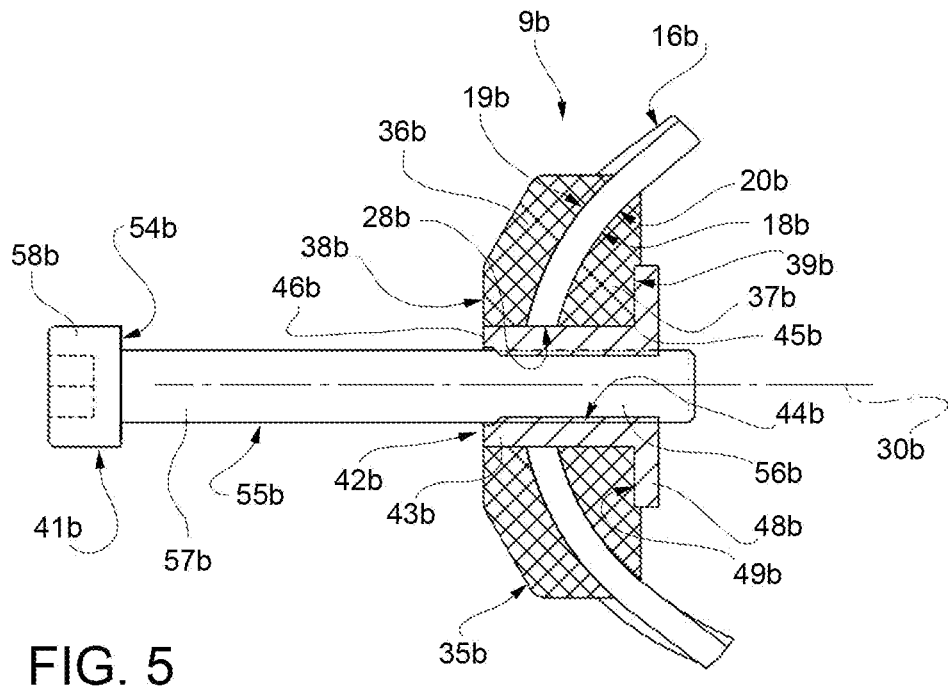
FIG. 4 is a cross section of another attachment interface of FIG. 1, taken along a section plane identified by line IV-IV in FIG. 1.

FIG. 4 shows the attachment interface 9*b*, which comprises parts indicated by the same reference numbers used in FIG. 2 for the attachment interface 9, but followed by reference letter "b".

In comparison with the attachment interface 9 of FIG. 2, the attachment interface 9*b* comprises only one plate portion 16*b* sandwiched between layers 36*b* and 37*b*. In particular, layer 36*b* is arranged directly on face 19*b*. Besides, preferably, the flange 48*b* is provided in the cavity 20*b*, in contact with surface 39*b*. On the other axial side, in the specific embodiment that is shown, the metal attachment device 41*b* does not comprise any washer. More specifically, end 46*b* of the sleeve 43*b* is not completely embedded in the composite material 35 and, in particular, is flush with surface 38*b*.

In this embodiment, preferably, the attachment element 55*b* is defined by a screw or bolt, comprising a stem having a threaded inner portion 56*b* screwed into the axial hole 44*b*. The attachment element 55*b* has an outer portion 57*b* defining a connection point for another vehicle element, e.g. for connecting a brake caliper (not shown). In particular, the outer portion 57*b* of the attachment element 55*b* comprises an end portion or head 58*b* suitable to axially clamp the vehicle element to be connected, between the surface 38*b* and an annular shoulder 54*b* of the head 58*b*. This axial clamping action can also exert an axial compression of the composite material 35*b* between the vehicle element to be connected and the shoulder 49*b* of the flange 48*b*.

The attachment interface 9*c* is identical to attachment interface 9*b*, and therefore is not described for sake of simplicity.

According to variants that are not shown, the head 58*b* can be replaced by a nut, screwed onto a threaded end of the outer portion 57*b*, and/or the latter could be integral with the insert 42*b* (i.e. the attachment element 55*b* and the insert 42*b* are replaced by a single metal piece, comprising an inner portion, embedded in the composite material, and a projecting outer portion defining a connection point for the vehicle element to be connected).

Figure 5:
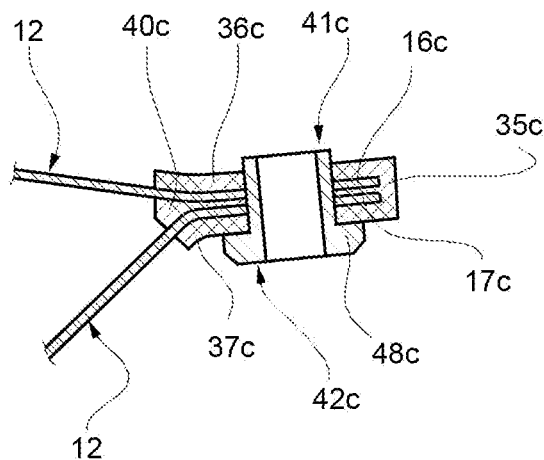
FIGS. 5 and 6 are cross-sections showing respective variants of the attachment interfaces of FIG. 1.

FIG. 5 partially shows a variant providing two plate portions 16*c* and 17*c* that are substantially planar (instead of being curve and/or defining a cavity). Besides, conveniently, the plate portions 16*c* and 17*c* are interposed between composite layers 36*c*, 37*c* and 40*c*, which are integral with each other, i.e. they define parts of a single body of composite material 35*c* (having the features of composite materials 35,35*a*,35*b*). Preferably, but not necessarily, the plate portions 16*c* and 17*c* are completely spaced apart from each other. According to this variant, in particular, a metal attachment device 41*c* (partially shown) is provided with an insert 42*c* having a relatively thick flange 48*c*.

Figure 6:
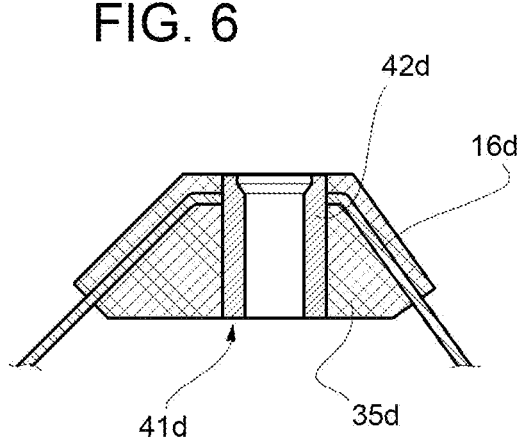

FIG. 6 partially shows a variant of the attachment device, indicated by reference numeral 41*d*. The metal attachment device 41*d* comprises an insert 42*d*, which is defined by a sleeve or bushing, without any flange. In particular, this arrangement is used when there is no need of axially compressing the plate portion 16*d* between the layers of the composite material 35*d*. According to another variant that is not shown, the insert 42*d* is absent and the metal attachment device 41*d* comprises a bolt, which has an inner portion extending through the axial passages in the plate portion 16*d* and in the layers of the composite material 35*d*, and an outer portion suitable to connect another vehicle element. In the meantime, the bolt can be fastened by a nut to compress the composite material 35*d*, e.g. between two washers.

It should be evident that in all the embodiments and variants that have been described above, the composite material selected from the group consisting of BMC, LFT and DLFT defines layers in which the composite plate portions are sandwiched to distribute the loads transferred by the metal attachment device 41,41*a*,41*b*,41*c*,41*d* to such plate portions. Besides, preferably, the composite material selected from the group consisting of BMC, LFT and DLFT is sandwiched to compress the plate portions and prevent possible delamination thereof.

Therefore, the attachment interface according to the present invention defines a more effective way of using composite materials in complex and heavily loaded applications, such as car corner suspensions. In the meantime, attachment interface according to the present invention is relatively flexible, as it can be used with metal attachment devices having different arrangements and/or different configurations. In particular, the use of a threaded coupling in the metal attachment device 41,41*a*,41*b*,41*c*,41*d* allows for easily compressing the plate portions between the layers of the composite material 35,35*a*,35*b*,35*c*,35*d*.

Furthermore, it is clear that the attachment interface of the present invention is relatively simple and economic to be manufactured, in addition to being performant. In particular, the layers of the composite material 35,35*a*,35*b*,35*c*,35*d* may be shaped according to the design requirements, in a simple manner.

All the objects of the invention are therefore achieved.

Finally, it should be evident that the attachment interface of the present invention can be applied to vehicle components different from the suspension uptight/knuckle 1 that has been shown as a particular non-limiting example.

What is claimed is:

1. An attachment interface for connecting a vehicle composite component, the attachment interface comprising:
    a first plate portion that is part of the composite component, is made of a first fiber reinforced polymer composite material and has a first passage extending in a through manner along an axis;
    a metal attachment device that comprises an inner portion engaging the first passage and an outer portion defining a connection suitable to be connected to another vehicle element;
    wherein the first plate portion is axially sandwiched between two layers made of a second fiber reinforced polymer composite material; and
    a second plate portion, arranged between the first plate portion and one of the layers and having a second passage, which is coaxial with the first passage and is engaged by the inner portion.

2. The attachment interface according to claim 1, wherein the second fiber reinforced polymer composite material is selected from the group consisting of BMC (Bulk Molding Compound), LFT (Long Fiber Thermoplastic) and DLFT (Direct Long Fiber Thermoplastic).

3. The attachment interface according to claim 1, wherein the inner portion is at least partly embedded in the second fiber reinforced polymer composite material.

4. The attachment interface according to claim 3, wherein the inner portion is an insert comprising a sleeve that has an axial hole; the outer portion being part of an attachment element engaging the axial hole in a fixed position.

5. The attachment interface according to claim 1, wherein the first and second layers are directly in contact with the first plate portion.

6. The attachment interface according to claim 1, wherein the metal attachment device comprises:
    a first and a second shoulder transverse to the axis; the second fiber reinforced polymer composite material being axially sandwiched between the first and the second shoulder; and
    a coupling suitable to be tightened so as to axially compress the second fiber reinforced polymer composite material between the first and second shoulders.

7. The attachment interface according to claim 6, wherein the first shoulder is defined by a washer.

8. The attachment interface according to claim 6, wherein the inner portion is an insert comprising a sleeve, and the second shoulder is defined by a flange provided at an axial end of the sleeve.

* * * * *